United States Patent Office 3,221,081
Patented Nov. 30, 1965

3,221,081
USE OF AMMONIA COMPLEX OF TRI-ALKYL BORON AS GELLING CATALYST FOR UNSATURATED POLYESTER RESINS
Jacques Sarradin, Antony, France, assignor to Compagnie de Saint-Gobain, Neuilly-sur-Seine, France
No Drawing. Filed Jan. 23, 1962, Ser. No. 168,237
Claims priority, application France, Jan. 30, 1961, 851,085
9 Claims. (Cl. 260—864)

This case relates to pregelling polyesters and to the polymerizable, pregelled compositions made by the novel method.

The unsaturated polyesters are a group of resinous compounds formed by the reaction between a polyhydric alcohol and a polybasic acid, one of which contains the group —CH=CH—. The condensation polymerization product is a linear polymer which is either a viscous syrup or a structureless solid. If "A" and "B" are the alcohol and acid radicals, the molecular structure can be represented as follows:

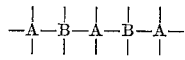

Such an ester remains unsaturated and because of the shape and size of the molecules the unsaturated groupings do not come into contact and do not interact.

The non reactivity of the double bond can often be changed by a third substance which cross links the linear chains. Thus if Q is an unsaturated substance which can interact with unsaturated group "B," then crosslinking occurs, forming a three dimensional network,

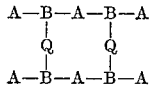

The long chain type is thermoplastic. The crosslinked type is thermohardening. The compound "Q" is called a modifying agent and is usually a monomer which is incorporated with the resin syrup during its manufacture, but in some cases it is mixed with the resin just before use. Examples of such modifiers are styrene, methyl methacrylate, vinyl acetate, and dialkyl phthalate.

In the present case the preferred polyesters are those which involve an unsaturated reaction product of a polyhydric alcohol and an alpha-beta unsaturated diacid (which may or may not be accompanied by a saturated diacid) in solution in an unsaturated, polymerizable solvent.

It has already been proposed to pre-gel polyesters by incorporating in them quantities of silica or its derivatives which act as thickeners and carriers for the polymerization catalyst which are only added as heating begins. It has also been proposed to obtain pre-gelling by adding the hydroperoxide of cumene, which gels the polyester at room temperature, the copolymerization with the unsaturated monomer awaiting the effect of heating. Those gels have a relatively short life.

It is an object of this invention to pre-gel polyesters and to produce pregelled polyesters which have a substantially longer life than those now known.

The objects of the invention are accomplished generally speaking by gelling polyesters resulting from the condensation of a polyhydric alcohol with a polybasic acid, in the presence of a monomer polymerizable by heat, at about room temperature with the assistance of catalysts being the ammonia complexes of trialkylboron. These compounds have the general formula $R_3B.NH_3$ in which R is alkyl which may have up to 10 C atoms but is preferably from 1–4 C atoms.

Into the ungelled, unpolymerized polyester one or more of the new gelling catalysts is carefully blended to insure uniform dispersal, and with it the polymerization catalyst which is to promote the copolymerization with the modifier either in the cold over a period of time or by heating. Such catalysts, of the types useful in the cold or during heating are well known.

The novel gelling catalysts can be made by adding ammonia to a trialkylboron. For example, dry ammonia is passed through liquid trimethylboron under an atmosphere of nitrogen or other inert gas. The trimethylboron can be made by reacting methylmagnesium iodide on etherolate of boron trifluoride. There is thus produced a white solid which can be distilled, and thus purified has a boiling point of 104° C. and a melting point of 77° C.

In a similar way borontriethylmonoammine is prepared as a somewhat viscous liquid boiling at 58° C. and 14 mm. Hg, in a yield of 98% of the triethylboron. The trialkylborons higher in the alkyl series are prepared similarly.

These ammonia complexes are not flammable in air, a material advantage. Their use is easy and their stability is excellent, which is verified by a study of their infrared spectra after progressively longer periods of storage, which shows no change in structure. These gelling catalysts have thus a substantially unchanging activity. They are efficient and accomplish gelling at room temperature rapidly without initiating the copolymerization which occurs, with time or with heat, when polymerization catalysts are mixed with the polyester prior to gelling. Polymerization catalysts of high temperature stability are preferred as this contributes to long periods of storage of the gels, for example several months.

The new gelling catalysts may advantageously comprise between .01 and .5% of the weight of the polyester but may exceed these limits. The gelling time is the longer as the amount of catalyst is less.

The known polymerization catalysts for unsaturated monomers are all useful, particularly the peroxides, and the amounts are those usually employed, since the gelling catalyst does not affect the activity of the polymerization catalysts. Those peroxides having high temperatures of decomposition are favored, such as peroxides of benzoyl and lauroyl, dicumyl peroxide, the hydroperoxide of para-tertio-butyl-cumene, dibenzal diperoxide, tertiary butyl peracetate, tertiary butyl perbenzoate, tertiary butyl peroxide, and 2,2 bis tertiobutyl peroxide butene. The latter named compounds have excellent action in the cold.

The new gelling catalysts act rapidly and the viscosity of the polyester rises equally rapidly after its addition. It is for this reason that it is advantageous to introduce the polymerization catalyst prior to the gelling catalyst so as to obtain homogeneous mixing. The polymerization catalyst tends to augment the activity of the gelling catalyst, which allows the operator to reduce the amount of gelling catalyst.

One may add to the polyesters with their admixed catalysts the accelerators and polymerization promoters frequently employed in polyester practice, as well as colors, without affecting the gelling.

The pregelled polyesters are used advantageously to make blocks, molded reinforced objects which can be removed from the mold after gelling and kept in that form for late copolymerization with the modifier either with time or heat, which eliminates the use of molds during the hardening of the resin.

These gels can also be used to make resin froths, the gel forming as the resin is filled with bubbles and expands. In molding objects of complex form it is advisable to use little gelling catalyst to permit good penetration of the resin into the recesses of the mold before hardening. Another method of use is to impregnate a fabric with the polyester and its catalysts, roll it up with an interfaced sheet of cellophane, and keep it so until copolymerization is to be carried out; in this case it is useful to impregnate the sheet with the polyester containing a polymerization catalyst, the gelling catalyst being added as a powder which is sprayed from solution in a volatile solvent onto the surface of the sheet. One can also pass the polyester impregnated sheet through a solution of the gelling catalyst, which is productive of even greater homogeneity.

The following examples illustrate the invention without limiting the generality of what has been elsewhere stated herein.

Example 1

50 grams of a polyester made from maleic anhydride, phthalic anhydride and propylene glycol known in commerce as "Stratyl A 16" received various quantities of different borontrialkylmonoamines, and the time required for gelling to occur was recorded as follows:

| Gelling catalyst | Content percent of the weight of polyester | Gelling time |
| --- | --- | --- |
| $(CH_3)_3B:NH_3$ | 0.02 | 2 minutes. |
|  | 0.0164 | 4 minutes. |
|  | 0.0162 | 12 minutes (minimum). |
| $(C_2H_5)_3B:NH_3$ | 0.1 | 30 seconds (maximum). |
|  | 0.05 | Do. |
|  | 0.02 | Do. |
|  | 0.015 | 60 seconds (maximum). |
|  | 0.012 | No gelification, viscosity increase at 48 h. |
| $(C_4H_9)_3B:NH_3$ | 0.1 | No gelification. |
|  | 0.2 | 7 m. |

The gels thus obtained were heated at 100° C. for two hours, after which there was no observable change in the appearance or in the consistency of the gel.

Example 2

50 g. of the same polyester were put into a mold with 2% by weight of the methylethylketone peroxide which was in a 60% solution in dimethyl phthalate and with .05% by weight of borontriethylmonoammine, gelling occurred immediately and it was removed from the mold. Its internal copolymerization took place in the cold in 18 to 20 hours producing a hard transparent mass.

Example 3

Operating as in Example 2 but adding 50 g. of calcium carbonate and 1% by weight of benzoyl peroxide as a paste of 50% concentration in tricresylphosphate. The gelling occurred immediately, the block was removed from the mold and was copolymerized by heating to 100° C. for one hour. The product was similar to that of Example 2.

Example 4

A mold was covered by a lubricant, placed between the plates of a press and lined with a pre-form of glass fiber. The same polyester of Example 1 was mixed with 1% by weight of benzoyl peroxide as a 50% paste in tricresylphosphate, and with .0162% by weight of borontrimethylmonoammine. A pressure of 1 kg./cm.$^2$ was applied. After 1 minute and 30 seconds the mold was opened and the object was removed and kept in its same condition for several days. After which it was copolymerized by heating at 110° C. for five minutes. A copolymerization could have been done earlier or later.

Example 5

Operating as in Example 4 but using .010% by weight of borontrimethylmonoammine, of the weight of the polyester. Complete gelling was obtained in six minutes and copolymerization was immediately carried out as in Example 4.

Example 6

A cotton cloth fabric was immersed in the polyester of Example 4 which contained 2% by weight of di (tertiobutyl) peroxide. The fabric was removed and immersed in an alcoholic solution of borontrimethylmonoammine in such quantities that .0162% by weight of the gelling catalyst was absorbed, percentage being on the weight of the polyester. The polyester gelled in one minute and 30 seconds and the cloth was rolled upon itself about a sheet of cellophane. It was retained three months in that condition. At the end of that time it was cut and the pieces were made into various shapes, and copolymerized at 130° C.

Although only a limited number of embodiments of the invention are described in detail in the foregoing specification, it is to be expressly understood that the invention is not limited thereto. Various other changes which will now be apparent to those skilled in the art may also be made without departing from the spirit and scope of the invention.

What is claimed is:

1. A method of forming stable, copolymerizable polyester gels which comprises incorporating a peroxidic polymerization catalyst and an ammonia complex of trialkyl boron into an ungelled organic polyester which is dissolved in a polymerizable monomer, the complex being present in a quantity ineffective beyond the gel stage, and allowing the mixture to stand at about room temperature until the polyester gells, thereby forming a stable polymerizable gel.

2. A method of forming stable, copolymerizable polyester gels which comprises incorporating an ammonia complex of trialkyl boron into an ungelled polyester monomer which is intermixed with a polymerizable monomer and with a peroxidic polymerization catalyst, exposing the mixture to about room temperature until the polyester is gelled, and preserving the gel under conditions of temperature and time at which the peroxidic polymerization the catalyst is inactive.

3. A method according to claim 1 in which the complex constitutes between about .01 to about .5% of the polyester.

4. The method of claim 1 in which the peroxidic catalyst is inert at room temperature and is activated at elevated temperature.

5. The method of claim 4 in which the peroxidic catalyst is an organic peroxide.

6. The method of claim 2 in which the peroxidic catalyst is active at elevated and substantially inert at room temperature.

7. A method of treating cloth which comprises impregnating the cloth with a composition containing a stable, gelled polyester intermixed with a polymerizable monomer, a peroxidic polymerization catalyst and the residue of an ammonia complex of trialkyl boron, storing the cloth under inert conditions of time and temperature, and thereafter activating the peroxidic catalyst by heat and completing the polymerization.

8. A catalytic mass containing an ungelled, polymerizable, organic polyester, a polymerizable monomer compatible therewith, a peroxidic polymerization catalyst, and a catalytic quantity of an ammonia complex of trialkyl boron.

9. The catalytic mass of claim 8 in which the peroxidic catalyst is a peroxide and the complex is present in about .01 to .5% of the weight of the polyester.

References Cited by the Examiner
UNITED STATES PATENTS

| | | | |
|---|---|---|---|
| 2,429,060 | 10—1947 | Hoover et al. | 260—865 |
| 2,643,983 | 6/1953 | Dangelmajer | 260—872 |
| 2,646,416 | 7/1953 | Parker | 260—75 |
| 2,973,337 | 2/1961 | Stroh et al. | 260—89.1 |
| 3,133,826 | 5/1964 | Varlet | 260—872 |

MURRAY TILLMAN, *Primary Examiner.*

LOUISE P. QUAST, SAMUEL H. BLECH,
*Assistant Examiners.*

UNITED STATES PATENT OFFICE
CERTIFICATE OF CORRECTION

Patent No. 3,221,081 November 30, 1965

Jacques Sarradin

It is hereby certified that error appears in the above numbered patent requiring correction and that the said Letters Patent should read as corrected below.

Column 4, line 53, strike out "the".

Signed and sealed this 20th day of September 1966.

(SEAL)
Attest:

ERNEST W. SWIDER
Attesting Officer

EDWARD J. BRENNER
Commissioner of Patents